United States Patent
Maslyn et al.

(10) Patent No.: US 9,099,701 B2
(45) Date of Patent: Aug. 4, 2015

(54) VEHICLE APPLICATION FOR AIR STORAGE CATHODE CARBON LOSS ESTIMATION

(71) Applicant: GM GLOBAL TECHNOLOGY OPERATIONS LLC, Detroit, MI (US)

(72) Inventors: Andrew J. Maslyn, Rochester, NY (US); Paul Taichiang Yu, Pittsford, NY (US); Rohit Makharia, Pittsford, NY (US)

(73) Assignee: GM Global Technology Operations LLC, Detroit, MI (US)

(*) Notice: Subject to any disclaimer, the term of this patent is extended or adjusted under 35 U.S.C. 154(b) by 222 days.

(21) Appl. No.: 13/685,474

(22) Filed: Nov. 26, 2012

(65) Prior Publication Data
US 2014/0147759 A1    May 29, 2014

(51) Int. Cl.
*H01M 8/04*    (2006.01)

(52) U.S. Cl.
CPC ...... *H01M 8/04664* (2013.01); *H01M 8/04305* (2013.01); *H01M 8/04447* (2013.01); *H01M 2250/20* (2013.01); *Y02E 60/50* (2013.01); *Y02T 90/32* (2013.01)

(58) Field of Classification Search
CPC .................................................. H01M 8/04305
USPC .............................. 429/413, 428, 429; 703/2
See application file for complete search history.

(56) References Cited

U.S. PATENT DOCUMENTS

| | | | |
|---|---|---|---|
| 8,195,407 B2 | 6/2012 | Salvador | |
| 8,232,014 B2 | 7/2012 | Arthur | |
| 2011/0091781 A1 | 4/2011 | Folmsbee | |
| 2011/0165499 A1* | 7/2011 | Janarthanam et al. | 429/513 |
| 2012/0138261 A1* | 6/2012 | Park et al. | 165/43 |
| 2012/0276466 A1 | 11/2012 | Sinha | |

OTHER PUBLICATIONS

Maslyn, Andrew J. U.S. Appl. No. 13/155,047, filed Jun. 7, 2011, entitled "Smart In-Vehicle Reactive Recovery".

* cited by examiner

*Primary Examiner* — Stewart Fraser
*Assistant Examiner* — Rachel Zhang
(74) *Attorney, Agent, or Firm* — John A. Miller; Miller IP Group, PLC

(57) ABSTRACT

A system and method for estimating an amount of carbon support loss in fuel cells of a fuel cell stack in a vehicle, for example, during vehicle off-times. The system and method include estimating an amount of time that a hydrogen concentration in the fuel cell stack is zero and calculating an amount of carbon loss based on the amount of time that the hydrogen concentration in the fuel cell stack is zero.

16 Claims, 1 Drawing Sheet

VEHICLE APPLICATION FOR AIR STORAGE CATHODE CARBON LOSS ESTIMATION

BACKGROUND OF THE INVENTION

1. Field of the Invention

This invention relates generally to a system and method for estimating cathode carbon loss in a fuel cell stack of a fuel cell system and, more particularly, to a system and method for estimating cathode carbon loss due to air storage in a fuel cell stack of a fuel cell system and adjusting fuel cell system operating strategies to compensate for the cathode carbon loss.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate protons and electrons. The protons migrate through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

There are a number of mechanisms that occur during the operation of a fuel cell system that cause permanent loss of stack voltage and performance, such as loss of catalyst activity and cathode carbon support corrosion. The impact of cathode carbon support corrosion on stack performance is nonlinear and can be caused by the storage of air in a fuel cell stack during off-times of a fuel cell electric vehicle (FCEV). Cathode carbon support corrosion is irreversible and can become fuel cell life limiting if not mitigated. U.S. patent application Ser. No. 13/094,300, entitled, "In-Vehicle Algorithm for Fuel Cell Stack Health Quantification", filed Apr. 26, 2011, assigned to the assignee of this application and herein incorporated by reference, discloses a method for determining the health of fuel cells in a fuel cell stack that includes determining a remaining catalyst surface area and catalyst support area of the catalyst layers of fuel cells in a fuel cell stack, which can be used to estimate stack voltage. However, there is a need in the art for a way to estimate carbon loss due to air storage vehicle off-time that allows for the mitigation of carbon loss, or the impact of carbon loss on fuel cell performance, once a predetermined estimated carbon loss limit is reached such that fuel cell failure is delayed, thereby increasing the life of the fuel cell stack.

SUMMARY OF THE INVENTION

In accordance with the teachings of the present invention, a system and method are disclosed for estimating an amount of carbon support loss in fuel cells of a fuel cell stack in a vehicle. The system and method include estimating an amount of time that a hydrogen concentration in the fuel cell stack is zero and calculating an amount of carbon loss based on the amount of time that the hydrogen concentration in the fuel cell stack is zero.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for estimating carbon loss in a fuel cell stack of a fuel cell system is merely exemplary in nature, and is in no way intended to limit the invention or its applications or uses.

Figure 1:
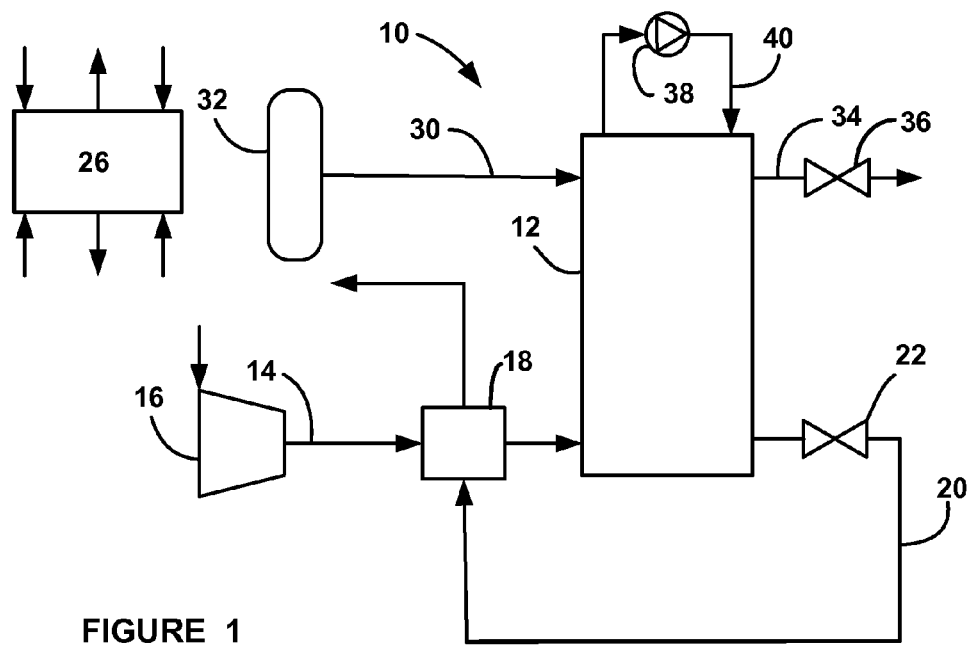
FIG. 1 is a schematic block diagram of a fuel cell system.

FIG. 1 is a schematic block diagram of a fuel cell system 10 including a fuel cell stack 12. A compressor 16 provides an airflow to the cathode side of the fuel cell stack 12 on a cathode input line 14 through a water vapor transfer (WVT) unit 18 that humidifies the cathode input air. The WVT unit 18 is one type of applicable humidification device, where other types of humidification devices may be applicable for humidifying the cathode inlet air, such as enthalpy wheels, evaporators, etc. A cathode exhaust gas is output from the stack 12 on a cathode exhaust gas line 20 through a back-pressure valve 22. The exhaust gas line 20 directs the cathode exhaust to the WVT unit 18 to provide the humidity to humidify the cathode input air. A controller 26 controls various fuel cell stack operations, including various control algorithms and fuel cell system devices, as is described in more detail below.

The anode side of the fuel cell stack 12 receives hydrogen gas from a hydrogen source 32 on an anode input line 30 and provides an anode exhaust gas on line 34 through a valve 36, such as a bleed valve, purge valve, etc. A pump 38 pumps a cooling fluid through the stack 12 and a coolant loop 40 external to the stack 12 to control the temperature of the stack 12. The temperature of the stack 12 is controlled to control operating parameters such as fuel cell stack humidity.

Figure 2:
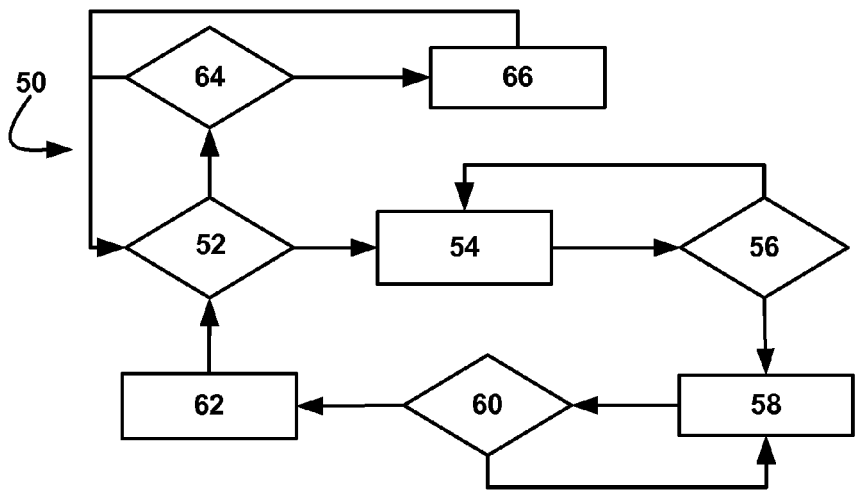
FIG. 2 is a flow chart diagram showing an operation for estimating cathode carbon loss in a fuel cell stack and remedial actions that may be taken if a predetermined threshold of cathode carbon loss has been achieved.

FIG. 2 is a flow chart diagram 50 showing a process for operating a cathode carbon support loss estimation algorithm that utilizes a model to estimate cathode carbon support loss due to air storage in the fuel cell stack 12 during fuel cell system off time, where the algorithm also mitigates cathode carbon support corrosion rate or fuel cell stack performance loss due to cathode carbon support loss once a predetermined estimated carbon support loss limit is reached, as is described in more detail below. The algorithm, which is part of the controller 26, begins at decision diamond 52 by determining if a vehicle that includes the fuel cell system 10 is in a vehicle off-state. If the algorithm determines that the vehicle is in a vehicle off-state the algorithm uses a gas concentration model to calculate the hydrogen concentration of the fuel cell stack 12 at box 54. An example of a hydrogen concentration model that may be used is described in U.S. patent application Ser. No. 12/721,416, entitled, "Online Method to Estimate Hydrogen Concentration Estimation in Fuel Cell Systems at Shutdown and Startup", filed Mar. 10, 2010, assigned to the assignee of this application and herein incorporated by reference.

Once the hydrogen concentration of the fuel cell stack 12 has been calculated at the box 54, the algorithm determines if the hydrogen concentration of the fuel cell stack 12 is equal to zero at decision diamond 56. If yes, the algorithm increments an event time at box 58. The algorithm begins incrementing the event time when the hydrogen concentration is equal to zero because it is assumed that the fuel cell stack 12 is in an air/air rich state before carbon loss begins to occur. If the hydrogen concentration of the fuel cell stack 12 is not equal to zero at the decision diamond 56, the algorithm returns to the box 54 to calculate the hydrogen concentration of the fuel cell stack 12 using the gas concentration model discussed above.

Once the algorithm increments the event time at the box 58, the algorithm determines if a key-on request has occurred at decision diamond 60. If a key-on request has not occurred, the algorithm returns to the box 58 and continues to increment the event time. If a key-on request has occurred at the decision diamond 60, the algorithm determines a total air storage carbon loss by adding a previous air storage carbon loss to an event carbon loss. The event carbon loss is determined using:

$$\text{Event } C \text{ Loss} = \frac{M_C}{4F} \int_0^\tau i_{COR} dt \qquad (1)$$

Where $$i_{COR} = i_0 e^{-\frac{E_a}{R}\left(\frac{1}{T} - \frac{1}{T_{ref}}\right)} e^{\frac{\alpha F}{RT}\eta} t^{-m},$$

$M_c$ is 12.0107 $g_{Carbon}$/mol$_{Carbon}$, F is 96485 C/mol e$^-$, R is 8.314 J/mol•K, t is off time duration (after it is determined that the hydrogen concentration in the fuel cell stack is zero), T is off time average temperature, $\eta$ is T corrected overpotential, and $i_o$, $E_a$, $\alpha$, m are material dependent empirically fitted parameters that may depend on (1) the materials used for the carbon support in fuel cells of the fuel cell stack 12, (2) catalyst surface area and (3) catalyst loading. Regression models are used to find these material dependent empirically fit parameters.

Using equation (1) above, the algorithm determines the event carbon loss and adds the event carbon loss to an air storage carbon loss, which is the event carbon loss from one or more previous off-states during which the hydrogen concentration of the fuel cell stack 12 was zero. If there has not been a previous vehicle off-state during which the hydrogen concentration of the fuel cell stack 12 was zero, the air storage carbon loss value will be zero. Every time an event carbon loss is calculated, it is added to the air storage carbon loss value so that the cumulative carbon loss due to air storage is tracked over time by the algorithm, as well as each individual event carbon loss. In this way, the algorithm predicts carbon loss as a function of vehicle off-time, as is discussed further below.

Once the total air storage carbon loss is determined at box 62 the algorithm returns to the decision diamond 52 to determine if the vehicle is in an off-state. If yes, the algorithm continues to determine event carbon loss as discussed in detail above. If the vehicle is not in an off-state at the decision diamond 52, the algorithm determines if the total air storage carbon loss is greater than a predetermined carbon loss limit threshold at decision diamond 64. If no, the algorithm returns to the decision diamond 52 to determine if the vehicle is in an off-state. If the total air storage carbon loss is greater than a predetermined carbon loss limit at the decision diamond 64, the algorithm signals the controller 26 to enable one or more remedial actions at box 66. Remedial actions include enabling the fuel cell system 10 to operate under drier operating conditions by changing the humidity and/or temperature of the fuel cell stack 12. Other remedial actions that may be taken include reducing carbon loss from other mechanisms. For example, remedial actions such as performing voltage recovery techniques with mitigation strategies may be used, as described in U.S. patent application Ser. No.

13/155,047, entitled, "Smart In-Vehicle Reactive Recovery Strategy", filed Jun. 7, 2011, assigned to the assignee of this application and herein incorporated by reference. Additional remedial actions include methods for hydrogen addition after shutdown, as described in U.S. patent application Ser. No. 12/636,318, entitled, "Fuel Cell Operational Methods for Hydrogen Addition After Shutdown", filed Dec. 11, 2009, assigned to the assignee of this application and herein incorporated by reference, and reconditioning of the fuel cell stack as described in U.S. patent application Ser. No. 12/580,912, entitled, "Automated Procedure for Executing In-Situ Fuel Cell Stack Reconditioning", filed Oct. 16, 2009, assigned to the assignee of this application and herein incorporated by reference. Once remedial actions are taken at the box 66, the algorithm returns to the decision diamond 52 to determine if the vehicle is in an off-state.

Figure 3:
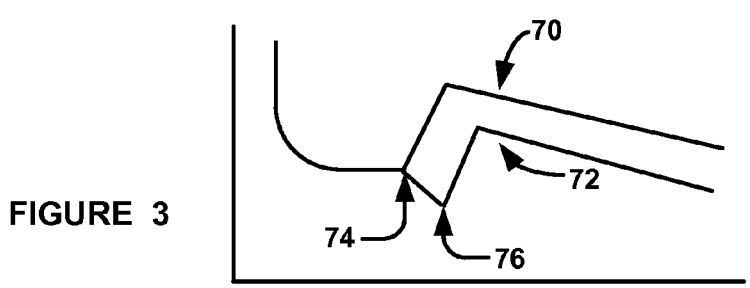
FIG. 3 is a graph with vehicle run time on the horizontal axis and cell voltage on the vertical axis.

FIG. 3 is a graph with vehicle run time on the horizontal axis and cell voltage on the vertical axis. Normal fuel cell operation is illustrated by line 70 and corroded fuel cell system operation is illustrated at line 72. Corroded fuel cell system operation is a fuel cell system that is operating with carbon support corrosion. As is shown in FIG. 3, both fuel cell systems run the same initially. At point 74 the cell voltage of the fuel cell stack 12 has declined and an in-vehicle voltage recovery process is performed. A typical in-vehicle voltage recovery process is to operate the fuel cell stack 12 under wet conditions, i.e., to recondition the fuel cell stack 12. In the normal fuel cell system shown by the line 70, the wet operation causes the cell voltage of the stack 12 to recover, as shown by the incline in the line 70 after the point 74. In the corroded fuel cell system shown by the line 72, the voltage does not recover and instead continues to decline after the voltage recovery process is performed, as is shown by the decline in the line 72 after the point 74. At point 76, a flag is set and the controller 26 combines the decrease in the cell voltage with the total air storage carbon loss to determine if operating the fuel cell system under drier operating conditions than is typically used is necessary to compensate for carbon loss that has occurred. As shown in FIG. 3, the cell voltage begins to increase when the fuel cell system begins to operate under drier conditions than is typically used, indicating that carbon loss has occurred.

As shown by the line 72, the cell voltage of the corroded fuel cell system increases after the fuel cell system begins to operate under drier conditions at the point 76. Because the cell voltage increased, the corroded fuel cell system may be operated under drier conditions for the remainder of the life of the fuel cell stack 12. Alternatively, the corroded fuel cell system may be operated under drier conditions for a period of time and then may be returned to normal operating conditions. If cell voltage of the corroded fuel cell system drops below a predetermined threshold after being returned to normal operating conditions, the system may be returned to drier operation temporarily or for the remainder of the life of the fuel cell system.

Using the algorithm discussed above, a mechanism is provided that utilizes the air storage carbon loss estimation to dynamically adjust vehicle operating strategy to avoid or compensate for catastrophic cathode carbon loss. Thus, this previously unknown information assists in durability operating strategy optimization. The remedial actions discussed above are examples of vehicle optimization strategies that may be taken, other remedial actions that optimize durability operation may also be used. Avoiding or compensating for carbon loss is used to extend vehicle life for those vehicles that experience a large amount of air storage events and/or duration, which may include a wide variety of possible customers. The algorithm discussed above provides more visibility into how severe the carbon loss is and allows for the fuel cell system 10 to compensate when and if it is necessary to do so.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for using an estimation of an amount of carbon support loss in fuel cells of a fuel cell stack in a vehicle, said method comprising:
providing a controller in the vehicle that is programmed for:
estimating an amount of time that a hydrogen concentration in the fuel cell stack is zero;
calculating an amount of carbon loss based on the amount of time that the hydrogen concentration in the fuel cell stack is zero;
adding the amount of carbon loss that occurs each time the vehicle is in an off-state and the hydrogen concentration is zero to give a total cathode carbon loss estimation; and
taking remedial actions if the total carbon loss estimation is greater than a predetermined carbon loss limit, wherein the remedial actions include voltage recovery with mitigation strategies, hydrogen addition after shutdown and reconditioning of the fuel cell stack.

2. The method according to claim 1 wherein estimating an amount of time that the hydrogen concentration in the fuel cell stack is equal to zero occurs when the vehicle is in an off-state.

3. The method according to claim 1 wherein determining an amount of time that the hydrogen concentration in the fuel cell stack is equal to zero includes using a gas concentration model.

4. The method according to claim 1 wherein the amount of time that the hydrogen concentration in the fuel cell stack is zero ends when a vehicle key-on request occurs.

5. The method according to claim 1 wherein calculating the amount of carbon loss based on the amount of time that the hydrogen concentration in the fuel cell stack is zero includes using:

$$\text{Event } C \text{ Loss} = \frac{M_C}{4F} \int_0^t i_{COR} dt$$

where $$i_{COR} = i_0 e^{-\frac{E_a}{R}\left(\frac{1}{T}-\frac{1}{T_{ref}}\right)} e^{\frac{\alpha F}{RT}\eta} t^{-m},$$

$M_c$ is 12.0107 $g_{carbon}/mol_{carbon}$, F is 96485C/mol e⁻, R is 8.314 J/mol·K, t is off time duration (after it is determined that the hydrogen concentration in the fuel cell stack is zero), T is off time average temperature, η is T corrected over-potential, and $i_o$, $E_a$, α, m are material dependent empirically fitted parameters that may depend on (1) the materials used for the carbon support in fuel cells of the fuel cell stack 12, (2) catalyst surface area and (3) catalyst loading.

6. A method for using an estimation of an amount of carbon loss in fuel cells of a fuel cell stack in a vehicle, said method comprising:
   providing a controller in the vehicle that is programmed for:
   determining that the vehicle is in a vehicle off-state;
   estimating an amount of time that a hydrogen concentration in the fuel cell stack is zero when the vehicle is in the vehicle off-state;
   calculating an event carbon loss based on the amount of time that the hydrogen concentration in the fuel cell stack is zero;
   adding the event carbon loss to an air storage carbon loss value to determine a total air storage carbon loss; and
   causing one or more remedial actions to occur if the amount of the total air storage carbon loss is greater than a predetermined threshold.

7. The method according to claim 6 wherein the air storage carbon loss value is equal to the sum of all previous event carbon losses or is equal to zero.

8. The method according to claim 6 wherein the amount of time that the hydrogen concentration in the fuel cell stack is zero ends when a vehicle key-on request occurs.

9. The method according to claim 6 wherein estimating an amount of time that the hydrogen concentration in the fuel cell stack is equal to zero includes using a gas concentration model.

10. The method according to claim 6 wherein remedial actions include voltage recovery with mitigation strategies, hydrogen addition after shutdown and reconditioning of the fuel cell stack.

11. The method according to claim 6 further causing the fuel cell stack to operate under drier conditions relative to normal operating conditions if the total air storage carbon loss is greater than the predetermined threshold.

12. A fuel cell system that uses an estimation of an amount of carbon support loss in fuel cells of a fuel cell stack in a vehicle, said system comprising:
   a controller programmed to provide:
   means for determining that the vehicle is in a vehicle off-state;
   means for estimating an amount of time that a hydrogen concentration in the fuel cell stack is zero when the vehicle is in the vehicle off-state;
   means for calculating an event carbon loss based on the amount of time that the hydrogen concentration in the fuel cell stack is zero;
   means for adding the event carbon loss to an air storage carbon loss value to determine a total air storage carbon loss; and
   means for causing one or more remedial actions to occur if the amount of the total air storage carbon loss is greater than a predetermined threshold.

13. The control system according to claim 12 wherein the means for estimating an amount of time that the hydrogen concentration in the fuel cell stack is equal to zero includes using a gas concentration model.

14. The control system according to claim 12 wherein estimating an amount of time that the hydrogen concentration in the fuel cell stack is equal to zero ends when a vehicle key-on request occurs.

15. The control system according to claim 12 wherein taking one or more remedial actions include voltage recovery with mitigation strategies, hydrogen addition after shutdown and reconditioning of the fuel cell stack.

16. The control system according to claim 15 further comprising means for causing the fuel cell stack to operate under drier conditions relative to normal operating conditions if the total air storage carbon loss is greater than the predetermined threshold.

\* \* \* \* \*